Aug. 5, 1924.  1,503,731
J. B. WALKER
PROCESS FOR PRODUCING MULTIPLY EXPOSED MOTION PICTURE FILMS
Filed May 3, 1922

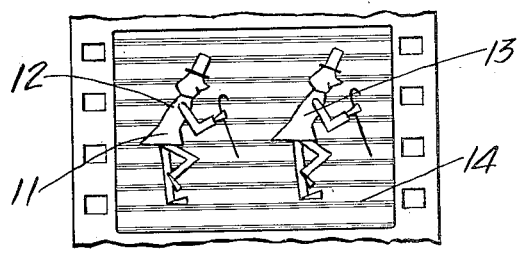

FRAME OF A DESIRED FINAL POSITIVE

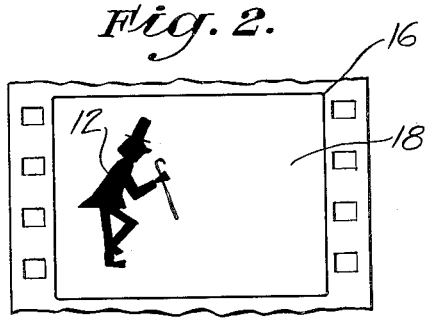

PRIMARY NEGATIVE

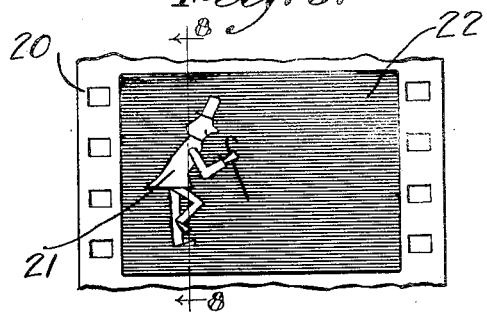

PRIMARY POSITIVE

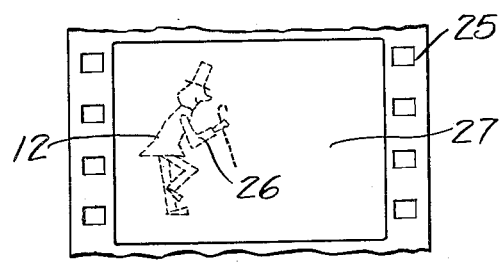

SECONDARY NEGATIVE-LIGHT IMPRESSED FROM PRIMARY POSITIVE

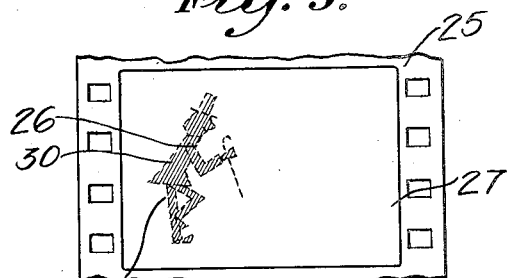

SECONDARY NEGATIVE TYPED WITH NON-ACTINIC DYE

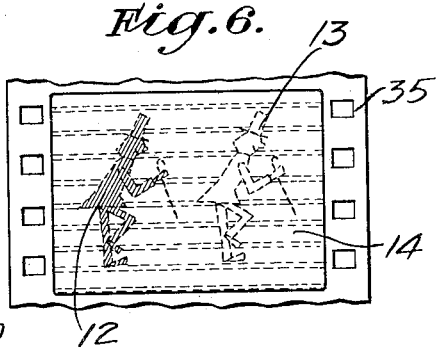

SECONDARY NEGATIVE LIGHT IMPRESSED FROM BACKGROUND

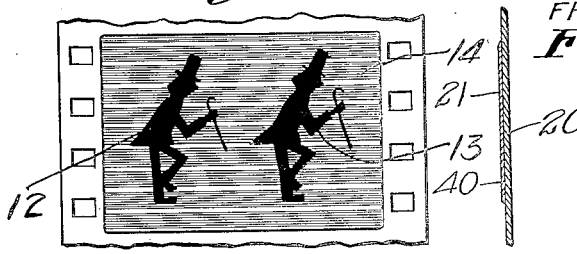

SECONDARY NEGATIVE-DEVELOPED

INVENTOR:
JOSEPH B. WALKER,
BY
ATTORNEYS.

Patented Aug. 5, 1924.

1,503,731

UNITED STATES PATENT OFFICE.

JOSEPH B. WALKER, OF LOS ANGELES, CALIFORNIA.

PROCESS FOR PRODUCING MULTIPLY-EXPOSED MOTION-PICTURE FILMS.

Application filed May 3, 1922. Serial No. 558,123.

*To all whom it may concern:*

Be it known that I, JOSEPH B. WALKER, a citizen of the United States, residing at Los Angeles, in the county of Los Angeles, State of California, have invented a new and useful Process for Producing Multiply-Exposed Motion-Picture Films, of which the following is a specification.

This invention relates to the production of motion pictures, and particularly to the production of motion picture film in which separate portions of the sensitized areas constituting the frames thereof are separately exposed at different times or at different places.

The methods now employed in the taking of multiple exposures result in a transparent or ghost-like appearance of the multiply exposed portions of the scene owing to the exposure of a single area of film more than a single time.

It is the principal object of my invention to provide a process whereby a film may, in its entirety, be multiply exposed, but whereby no area thereof will receive more than a single subjection to actinic light rays, thus eliminating the undesirable effects enumerated above.

It is also an object of my invention to accomplish the multiple exposure of a film without resorting to the employment of travelling mats.

I attain the objects of my invention by the imprinting of opaque or color substances upon certain portions of an undeveloped negative film to prevent the action of light rays upon these portions while the surrounding area is being exposed.

Other objects and advantages will be made evident hereinafter.

My invention is adapted to use in instances wherein it is desired to photograph a person or an object in one location and to photograph another object or scene in another location, then having both appear in the final film.

It is also quite often desirable in the production of a motion picture to have a certain character thereof make a multiple appearance therein; that is, to appear at the same time as separate characters or as his own double. This is accomplished by making a number of exposures upon a single negative, the character desired in multiple appearance being photographed in the different positions in the scene necessary to the fulfillment of the requirements of the story being photo-dramatized.

Referring to the drawing, which is for illustrative purposes only,

Fig. 1 shows a single frame of a positive film containing an image in representation of a scene in which a single character makes a duplicate appearance.

Fig. 2 shows a developed negative frame taken of the character in one of the positions in which it is desired to appear in the final positive.

Fig. 3 represents a developed positive frame printed from the negative frame shown in Fig. 2.

Fig. 4 represents an undeveloped duplicate negative frame which may be printed from the positive shown in Fig. 3.

Fig. 5 shows the duplicate negative after the non-actinic screen has been applied to the area thereof containing the undeveloped image.

Fig. 6 shows the duplicate negative after the character in its second position and the background has been photographically impressed thereupon.

Fig. 7 shows the duplicate negative after it has been developed so that such a positive as shown in Fig. 1 may be printed therefrom.

Fig. 8 is a fragmentary section on a plane represented by the line 8—8 of Fig. 3.

It is old and well known in the art, that the images of photographic negatives are inverted in both position and light values. It is, however, evident that a negative when viewed from the back will show the image in rectified position, but inverted in light values. It is also evident that secondary positives and negatives may be produced in four positions of inversion, by use of a photographic printer, or a contact printer employing parallel light rays. For the sake of simplicity and to enable the process to be readily traced, the various negatives of the drawing are shown as rectified images such as would be obtained by viewing a negative film from the back thereof.

In a multiply exposed film a character may be required to appear an indefinite number of times in the final photographic image of a certain scene, but for the purpose of illustrating the practice of my invention, a duplicate appearance of the character in the final positive print is shown in the drawing and hereinafter described.

The enlarged view of one frame of a double exposed positive film, shown in Fig. 1, has the duplicate appearance of a character represented therein in the form of a manikin 11 which appears in the first and second positions 12 and 13, against a background 14 which is intended to represent the setting of a scene in actual production. As shown in Fig. 2, a primary negative 16 is prepared by photographing the character in the first position 12 before a non-actinic curtain, such as a black cloth. Since the curtain does not reflect actinic rays, the area 18 surrounding the figure is not exposed, and since there are no light rays directed thereupon, appears perfectly transparent in the developed negative.

From the primary negative 16 a primary positive 20, Fig. 3, is printed, this positive having a translucent image 21 of the manikin in the first position, surrounded by an opaque area 22. A secondary or duplicate negative 25, Fig. 4, may then be prepared from the positive, the image 26 in this instance being merely light-impressed upon the sensitive film and not developed. Owing to the opacity of the area 22 in the positive 20, the area 27 surrounding the image 26 is unexposed.

It will be perceived that the only difference existing between the primary negative 16 and the duplicate negative 25 is that the primary negative has been developed, while the duplicate negative is left undeveloped so that a second exposure thereof may be made. This duplicate negative may also be prepared by the use of two cameras or of a camera adapted to expose several films simultaneously.

One of the particularly essential features of my invention is the covering of the exposed image of the duplicate negative with a non-actinic substance for the purpose of preventing a further exposure of the area of the negative upon which the image has already been impressed in the first position. This screen is applied to the image 26 of the negative 25, as indicated at 30 in Fig. 5, in the form of a colored or opaque dye. A preferred manner in which this is accomplished is as follows:

The primary positive 20 is then chemically treated to relatively raise the image 21 of the mannikin from the surrounding area, as shown at 40 in Fig. 8 thus providing a type by which the non-actinic substance may be applied to the duplicate negative 25. The duplicate negative is then typed with the desired liquid dye by first applying the dye to the surface of the projecting image of the type with inking rollers and then bringing the type against the duplicate negative, with the result that the dye carried upon the type is coated upon the surface of the duplicate negative, and, drying thereupon, forms a screen which covers the exposed portion 26 thereof, thus forming a protection against further exposure of that area when the negative is placed in the camera for further exposure. Continuous lengths of film may be so treated by running the duplicate negative and the type film over rollers which are placed so as to bring the inked type against the surface of the negative.

After the dye has thoroughly dried, the duplicate negative is placed in the camera and the character is photographed against the background 14 in the second position 13. The negative film, as indicated at 35 in Fig. 6, now contains the light impressions of the character in both the first and second positions 12 and 13 as well as light impressions of the background 14. The dye is then washed from the area containing the impression of the mannikin in the first position and the negative developed, as shown in Fig. 7. It is from this final negative that the positive shown in Fig. 1 has been printed.

Although I have illustrated and described my invention in connection with a double exposed film, it will be perceived that the process may be continued through a greater number of exposures.

One method which may be employed, consists of running the sensitized negative 16 through the camera a number of times and photographing the mannikin in different positions in front of the non-actinic curtain, then proceeding with the negative as previously described. Another method is to photograph a separate primary negative 16 for each position of the mannikin; print a primary positive 20 from each of the primary negatives; and then from these primary positives 20 to light impress a secondary negative 25 which is then typed from printing members formed from the primary positives 20, after which the secondary negative may be treated in the manner previously described.

The particularly valuable feature of my invention resides in the fact that its use enables a number of objects, persons or scenes to be photographed separately in various locations and at different times as separate images, and to thereafter be combined in a final composite image without transparent effect, the persons or objects making either single or multiplicate appearance in the final image, as desired.

I claim as my invention:

1. In the production of multiply exposed photographic impressions, the process of exposing a portion of the area of a receptive surface, and thereafter typing a dye over said exposed portion to protect same against further exposure during subsequent operations.

2. In the production of multiply exposed photographic impressions, the process of: exposing a portion of the area of a receptive surface; typing a dye over said exposed portion of said receptive surface; and thereafter exposing the remainder of said receptive surface.

3. In the production of multiply exposed photographic impressions, the process of exposing a portion of the area of a receptive surface, and thereafter typing a non-actinic dye over said exposed portion to protect same against further exposure during subsequent operations.

4. In the production of multiply exposed photographic impressions, the process of: exposing a portion of the area of a receptive surface; typing a non-actinic dye over said exposed portion of said receptive surface; and thereafter exposing the remainder of said receptive surface.

5. In the art hereinbefore described, the process of exposing a portion of the area of a film, and thereafter typing a substance over said exposed portion to protect same against further exposure during subsequent operations.

6. In the art hereinbefore described, the process of: exposing a portion of the area of a film; typing a substance over said exposed portion of said film; and thereafter exposing other portions of said receptive surface.

7. In the art hereinbefore described, the process of: exposing a portion of the area of a film; placing a substance over said exposed portion of said film to protect same against further exposure during subsequent operations; and thereafter exposing other portions of said receptive surface.

8. In the production of multiply exposed photographic impressions, the process of exposing a portion of the area of a receptive surface, and thereafter placing a dye over said exposed portion to protect same against further exposure during subsequent operations.

9. In the production of multiply exposed photographic impressions, the process of: exposing a portion of the area of a receptive surface; placing a dye over said exposed portion of said receptive surface by contact with a photographically prepared printing plate; and thereafter exposing the remainder of said receptive surface.

In testimony whereof, I have hereunto set my hand at Spokane, Washington, this 25 day of April, 1922.

JOSEPH B. WALKER.